United States Patent [19]
Chang et al.

[11] Patent Number: 5,469,574
[45] Date of Patent: Nov. 21, 1995

[54] METHOD AND SYSTEM FOR INTERFACING INTERPRETED APPLICATIONS WITH COMPILED PROCEDURES USING SIGNATURE FILES

[75] Inventors: Daniel T. Chang, San Jose, Calif.; Yaron Wolfsthal, Haifa, Israel

[73] Assignee: International Business Machines Corporation, Armonk, N.Y.

[21] Appl. No.: 79,188

[22] Filed: Jun. 18, 1993

[51] Int. Cl.⁶ ........................................... G06F 9/45
[52] U.S. Cl. ..................... 395/700; 364/DIG. 1; 364/280.4
[58] Field of Search ............................................... 395/700

[56] References Cited

U.S. PATENT DOCUMENTS

| | | | |
|---|---|---|---|
| 4,949,255 | 8/1990 | Gerth et al. | 364/200 |
| 5,210,876 | 5/1993 | Uchida | 395/700 |
| 5,274,821 | 12/1993 | Rouquie | 395/700 |
| 5,307,499 | 4/1994 | Yin | 395/700 |

OTHER PUBLICATIONS

APL2 General Information (GH20-9214-4) published by IBM Corp., 1987, pp. 35-39.
M. Auslander et al., "Dynamic Linking and Loading in the AIX System", IBM RISC System/6000 Technology, publication No. SC23-2619, IBM Corp., 1990, pp. 150-153.
W. Wilson et al., "An Approach to Genuine Dynamic Linking", Software–Practice and Experience, vol. 21(4), Apr. 1991, pp. 375-390.

*Primary Examiner*—Thomas M. Heckler
*Attorney, Agent, or Firm*—Baker, Maxham, Jester & Meador

[57] ABSTRACT

Method and system for processing an interpretable program having calls to a separately compiled procedure is described. The interpreter uses a predefined signature file (SIGFILE) to identify the arguments and result of the separately compiled procedure. The interpreter then generates source code for a call file (CALLFILE) from the information in the signature file. The CALLFILE procedure accepts the arguments for the separately compiled procedure from the interpreter and passes the arguments to the separately compiled procedure. The result, if any, of the separately compiled procedure is returned to the CALLFILE which in turn returns the result to the interpreter. A CALLFILE procedure may be used for more than one separately compiled procedure by passing in the address of the particular separately compiled procedure which is to be called.

18 Claims, 3 Drawing Sheets

METHOD AND SYSTEM FOR INTERFACING INTERPRETED APPLICATIONS WITH COMPILED PROCEDURES USING SIGNATURE FILES

TECHNICAL FIELD

The present invention relates to methods and systems in the field of interfacing interpreted computer program applications with compiled procedures which require parameters and/or return values.

BACKGROUND OF THE INVENTION

Application programs are often constructed by linking several separately-compiled object modules, possibly written in different languages. The linking process combines the separate modules, through relocating symbols and resolving external references, to form a single executable module.

Interpreted applications, however, do not result in object code when translated—implying that such applications cannot be linked with the external procedures they call. Thus, calls From interpreted applications to separately-compiled procedures must be realized in another way. One approach is to link the external procedures with a separately-compiled program that serves requests for calling the procedures. (See for example, APL2 General Information (GH20-9214-4), published by IBM Corporation 1987, pp. 35-39). This type of program is executed as a separate process, which is given control whenever the interpreter detects an external procedure call in the application. This approach, however, results in undesirable process invocation and communication overhead.

A naive approach to communicate the arguments and the result between an interpreter and a loaded procedure is to include selection code in the interpreter, which will branch to a different calling sequence for each possible combination of argument and result types. Taking this approach, however, results in a totally impractical size of the selection code. For example, to support procedure calls with up 8 arguments of 5 possible types, the number of calling sequences in the selection code is greater than 2,400,000. Therefore, this approach is not a satisfactory solution to the problem.

Another way to communicate tile arguments and the result between an interpreter and a loaded procedure is to implement the calling sequence in assembler language. This approach is rather efficient From an execution time viewpoint, since the interpreter and the external procedures can communicate the arguments and/or result by directly placing them onto the run-time stack. An obvious disadvantage of this approach, however, is that it is low-level and machine-dependent. Beyond the inherent intricacies of assembler programming, additional complexity arises from the different representations of data types that procedure arguments may assume, both within and across the programming languages in which external procedures are written. Also, the assembler approach essentially involves hardware considerations unique to the particular architecture involved. It also must be uniquely tailored to the particular procedure call mechanism at hand and to the structure of the procedure activation records under the operating system used.

When an interpreted application calls a separately compiled procedure, there must be a mechanism for (1) invoking the procedure and (2) communicating the arguments and/or result between the application and the procedure. A solution to the first task is provided by the load() system call, which is supported in IBM's commercially available AIX Operating System Version 3. By using load(), an interpreter can add an object module into its address space during its execution, and then reference the external procedures contained in that module. (See M. Auslander, A. Chibib, C. Hoagland, M. Kravetz, "Dynamic Linking and Loading in the AIX System", IBM RISC System/6000 Technology, publication no. SC23-2619, IBM Corporation, 1990, pp. 150–153). The load() Function can be found on other operating systems as well. (See for example, W. Wilson, R. O. Olson, "An Approach to Genuine Dynamic linking", Software-Practice and Experience, Vol. 21 (4), April 1991, pp. 375–390). However, load() is not designed to support the communication of arguments and/or result between the issuer of load() and a dynamically loaded procedure. As a result, the regular use of load() does not allow an interpreter to call separately compiled procedures that take arguments and/or return a result.

SUMMARY OF THE INVENTION

The invention is a method and system for processing an interpretable program having calls to a separately compiled procedure. When the interpreter encounter the calling reference, a pre-existing signature file (SIGFILE) is read which corresponds to the calling reference. The SIGFILE identifies the location, language, arguments and result of the externally compiled procedure, referred to as the SIGNATURE of the procedure. The interpreter then generates source code for a call file (CALLFILE) procedure corresponding to the SIGFILE. The CALLFILE procedure accepts the arguments for the separately compiled procedure from the interpreter and passes the arguments to the separately compiled procedure. The interpreter invokes a compiler to compile the source code for the CALLFILE procedure into loadable object code. At execution time the interpreter calls the CALLFILE procedure with the arguments for the separately compiled procedure. The result, if any, of the separately compiled procedure is returned to the CALLFILE procedure which in turn returns the result, to the interpreter. The SIGFILE may contain signatures for multiple routines identified by name. The CALLFILE may contain multiple procedures corresponding to a set of separately compiled procedures. A CALLFILE procedure may be used for more than one separately compiled procedure by passing in the address of the particular separately compiled procedure which is to be called. Once a CALLFILE has been created it may be saved for re-use: therefore, the interpreter may check for the existence of a valid CALLFILE before recreating it.

DETAILED DESCRIPTION OF THE INVENTION

Figure 3:
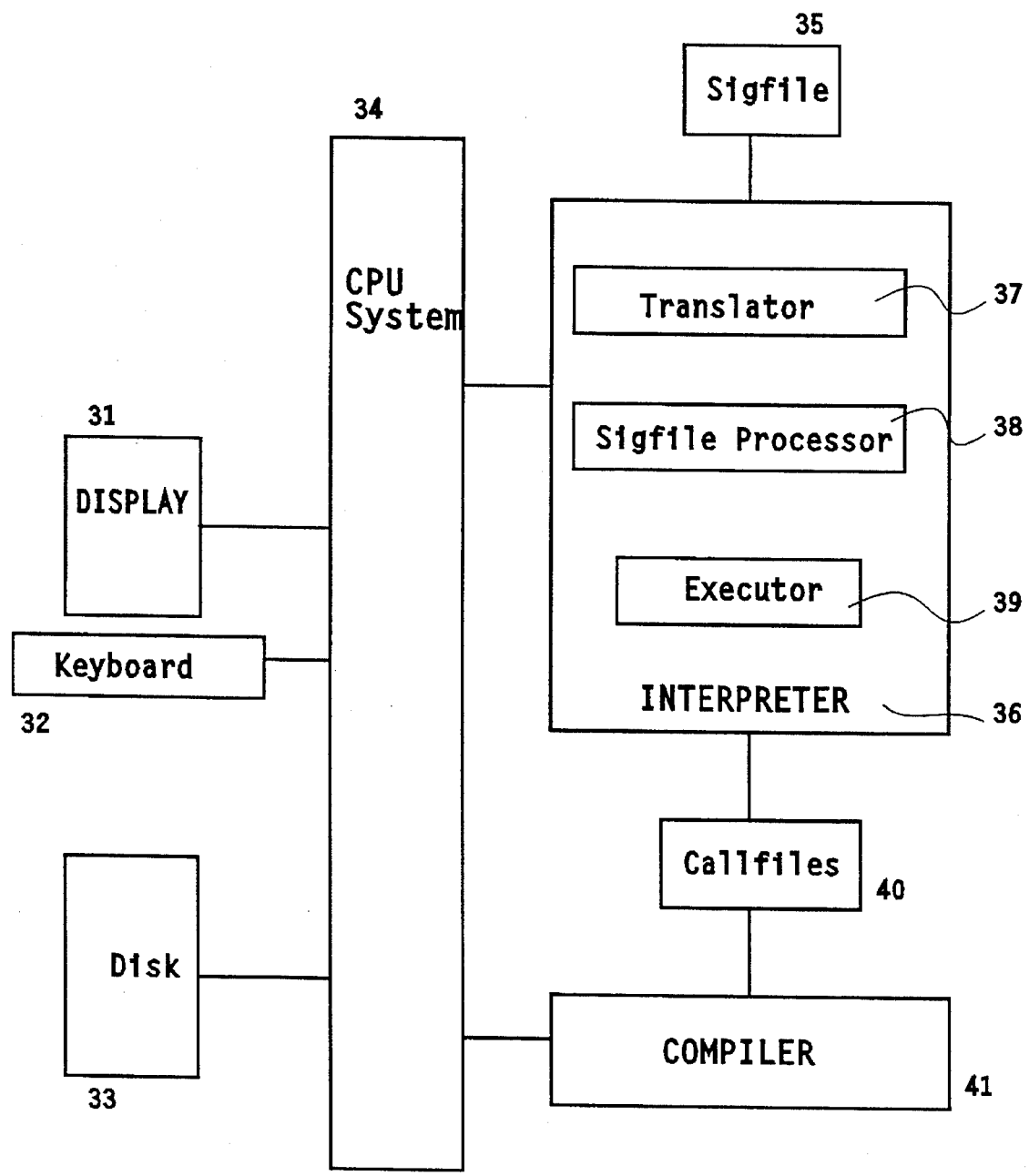
FIG. 3 is a block diagram of the components of a system using the invention.

The detailed embodiment of the invention which will be described is in an Interpreter. Reference is made to FIG. 3. The Interpreter 36 consist of three major parts: a Translator 37, a Sigfile Processor 38 and an Executor 39. The role of the Translator is to translate an application into an intermediate code, which is to be executed (possibly at a later time) by the Executor. The operating system environment of the Interpreter is IBM's AIX Version 3, running on an IBM RISC System/6000. The operating system is not shown in FIG. 3, but functions in the standard way as a lower level interface to the CPU system. The standard components of a typical workstation or personal computer are shown in FIG. 3, i.e., CPU system 34 (which includes the microprocessor and memory), a display 31, a keyboard 32, and a disk 33 for nonvolatile storage, but the invention may also be used in a minicomputer or mainframe system with other operating systems.

By using load() or similar means an Interpreter can dynamically load and bind a module containing the desired external procedure(s), and then reference these procedure(s). However, load() is not designed to support the communicating of arguments and/or result between the issuer of load() and a dynamically loaded procedure. Thus, the regular use of load() does not allow an Interpreter to call separately compiled procedures that take arguments and/or return a result.

The invention uses CALLFILES 40 and SIGFILE(s) 35 to achieve the desired result. Each SIGFILE contains one or more signature definitions for separately compiled routines. The SIGFILE is processed by the SIGFILE processor 38 which is activated when the Translator encounters a call to a separately compiled routine. The SIGFILE processor uses the signatures in the SIGFILE to generate the source code for the CALLFILE(s). The source code for the CALLFILE is compiled by a standard compiler 41 which is external to the Interpreter. The loadable object module for the CALLFILE is a set of generic functions, which serve as an interface between the Interpreter and the separately compiled procedure(s). To call an external procedure, the Executor 39 dynamically loads the CALLFILE and the desired external procedure. The Executor then calls an appropriate CALLFILE function with the proper arguments. The CALLFILE function, in turn, calls the desired external procedure, A feature of a CALLFILE is that it is automatically generated by the Translator when the application is translated. The actual content of the CALLFILE is governed by the information that the Translator retrieves from a special file, called a SIGFILE, that is associated with the application. The association can be made by any one of a number of standard programming techniques such as explicit declaration or file naming conventions. The preprocessing time required to generate a CALLFILE is proportional only to the number of the external procedures called.

Figure 1:
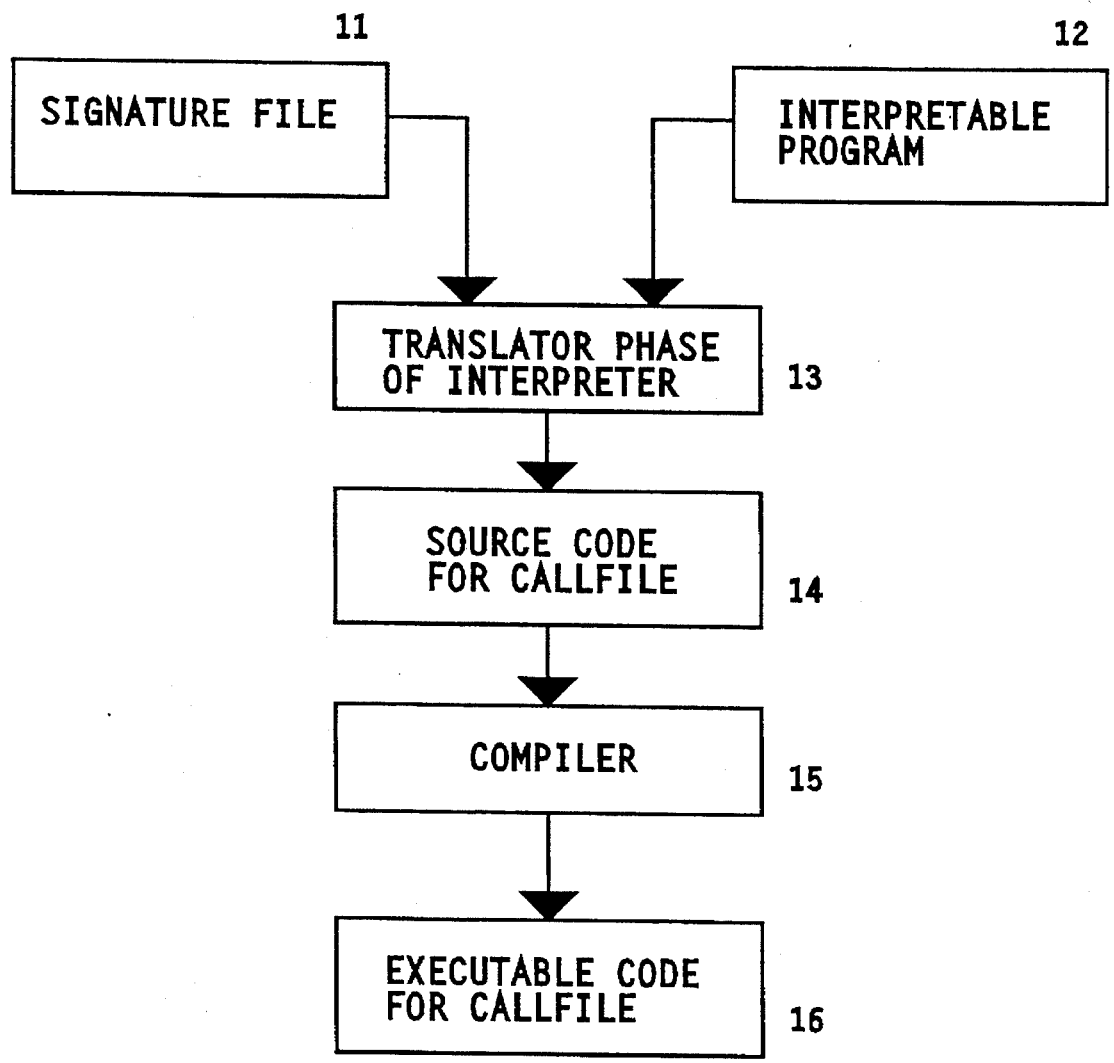
FIG. 1 is an overview of the process of generating a CALLFILE.

FIG. 1 shows the process of generating a CALLFILE. The Interpretable program 12 is processed by the Translator 13. When the Translator finds a "call" statement which references a separately compiled routine, the Translator reads the SIGFILE 11 to find the signature definition corresponding to the calling reference. The Translator uses the signature definition to generate the source code for the CALLFILE 14. The CALLFILE source code is then compiled using a standard compiler 15 to get the executable code for the CALLFILE 16. For maximum efficiency the executable code for the CALLFILE should be stored on non-volatile storage for re-use later. In a system where the CALLFILES are stored for re-use the Translator will check to see whether a current CALLFILE already exists for the routine. If the SIGFILE has been changed since the date that the CALLFILE was compiled, then a new CALLFILE will be generated.

Figure 2:
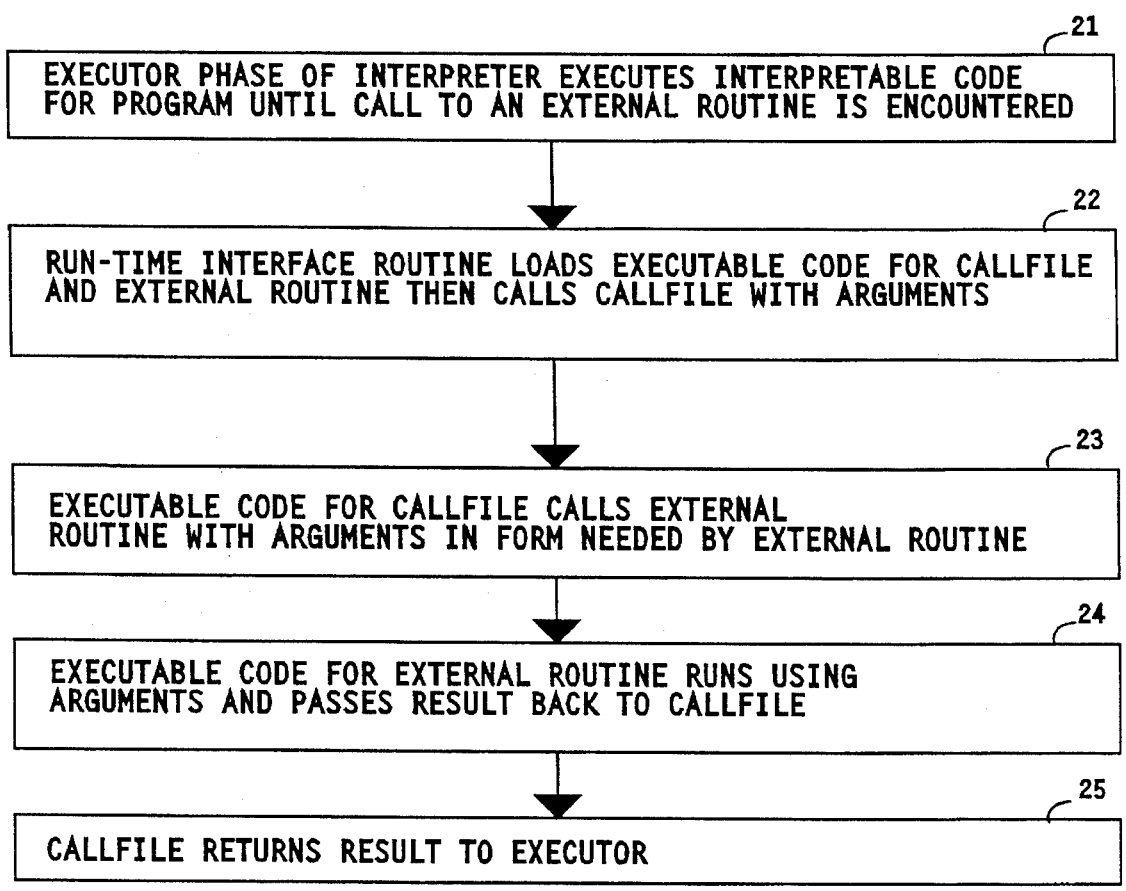
FIG. 2 is an overview of the process of executing an interpretable program using a CALLFILE.

FIG. 2 shows the process of executing an interpretable program using a CALLFILE. The interpretable code is executed by the Executor until a call to a separately compiled routine is encountered 21. The code being interpreted by the Executor may be the intermediate code produced by the Translator or in an alternative embodiment the Executor may use the interpretable source directly. The Translator and Executor portions of the Interpreter may be executed in separate passes, but it is possible to combine the Translator and Executor portions or the Interpreter into a one pass process according to well known techniques. After the executable code for the CALLFILE and the separately compiled routine are loaded into memory, the run-time interface routine or the Interpreter calls the CALLFILE with the proper arguments 22. The CALLFILE code then executes a call to the separately compiled routine with the arguments in the required format 23. The separately compiled routine runs using the arguments and perhaps generates a result which is passed back to the CALLFILE 24. The result, if any, is then returned to the Executor portion of the Interpreter 25. Since not all routines return a result, there may be no result to return to the Interpreter. Datatype conversion is not performed in the CALLFILE. Conversion of types is handled by the Interpreter.

SIGFILES

An interpreted application that calls external procedures is associated with a special file, called SIGFILE, which contains the names and signatures of the external procedures called by the application. In the detailed embodiment a procedure signature consists of the following data:

1. the file, or library, where the procedure resides,
2. the language in which the procedure is written,
3. the type of the result, and
4. the type and passing mode (constant/variable) of each argument (the names of the arguments are not relevant, but their order should be consistent with the procedure definition).

A sample SIGFILE appears in Table 1:

TABLE 1

| ROUTINE: | ekkcrsh | |
|---|---|---|
| FILE | "osl" | |
| LANGUAGE | fortran | |
| TYPE | void | |
| INPUT | | |
| rtcod | :integer | (variable); |
| dspace | :array[ ] of real | (variable); |
| typeCrash | :integer; | |
| END | | |

The sample in Table 1 defines a signature of a routine named "ekkcrsh" written in FORTRAN which is found in the widely used Optimization Scientific Library (OSL). The input arguments are an integer passed as a variable, an array of real numbers passed as a variable and an integer passed as a constant. Note that because there any only two passing modes, "constant" is the default and need not be explicitly coded. For this routine there is no separate return value. This is indicated by the "TYPE void" entry.

The Appendix shows a sample SIGFILE containing multiple signatures. Note that different procedures may have the same signature, and that different applications may use the same SIGFILE. The SIGFILES may be written in any code recognized by the Translator. The SIGFILES may be created manually by users using standard editing tools. The signatures of procedures contained in a standard library such as OSL are defined in a library-specific SIGFILE, which can be included by the SIGFILE of any application that uses the library.

CALLFILES

Following is a detailed description of the generation and use of a CALLFILE. The variable labels used refer to Table 2.

1. A CALLFILE, generated by the SIGFILE Processor, is a collection of generic functions, one for each different procedure signature given in the SIGFILE file. The role of a generic function is to invoke one or more external procedures whose signature corresponds to this generic function.

In the detailed embodiment each generic function accepts the following three arguments:

Arg. 1: the address of a desired external procedure (fP),

Arg. 2: the address of an array called the argument array (args_array), and

Arg. 3: the address of a variable where the result of the desired procedure is to be assigned (retP).

3.

The importance of the CALLFILE in the described scheme cannot be overstated. Superficially, it may seem that the Interpreter can directly load and execute the desired external procedure. However, the CALLFILE is indispensable: the generic function, generated according to the procedure signature, sets up the appropriate number and types of the arguments and/or result value of the procedure call, thus ensuring its correct execution.

A sample CALLFILE is as follows:

TABLE 2

```
f_713_213_38_213(fP, args_array, retP)
        /* f_713_213_38_213 is an encoding of a procedure signature.    */
        /* Procedures with this signature are written in Fortran, take  */
        /* three arguments: (1) an integer, (2) an array of doubles,    */
        /* and (3) an integer, and do not return a value                */
        /* (equivalently, return void type).                            */
        /* Note that the arguments are passed by reference (Fortran     */
        /* convention).                                                 */
{
int             (*fP) ();
union           value *args_array;
int             *retP;
*retP           = fP (&args_array[0].integer,    /* Calling the   */
                     args_array[1].real_array,   /* external      */
                     &args_array[2].integer);    /* procedure!    */
}
```

The argument array is an array of C-language unions used for passing the arguments to the procedure; it is described in detail below. The generic function essentially calls the external procedure whose address is given by Arg. 1. The appropriate elements of the argument array, Arg. 2, are passed as individual arguments in the call the procedure. The value returned by the procedure, if any, is assigned to the address given by Arg. 3. The generic function depicted in Table 2 corresponds to the signature of Table 1. As seen, the actual content of a generic function is governed by the corresponding signature, which is reflected in:

a. the type of the value returned by the procedure (i.e., the type of fP and retP), b. the number of the procedure's arguments, c. the types of the procedure's arguments (indicated by the selected fields of the argument array's elements), and d. the argument passing method (by value or by reference, depending on the convention of the language specified in the signature). After generating the CALLFILE program, the Translator has a component which selects the correct compiler and causes the source code for the CALLFILE to be compiled and bound into a loadable object module.

2. At run-time, the Executor performs the following steps whenever it detects an external procedure call in the application:

a. Set tile appropriate elements of the argument array with the actual arguments specified by the application.

b. Load the CALLFILE module (if not previously loaded).

c. Load the object module that contains the desired external procedure (if not previously loaded).

d. Call the generic function corresponding to the external procedure with the procedure address passed as Arg. 1, the address of the argument array as Arg. 2, and the address of the variable designated for the result as Arg.

The name generated for a generic function in the detailed embodiment is an encoding of the corresponding signature. The name begins with a character that represents the programming language indicated in the signature (e.g., 'c' for C, 'f' for Fortran), followed by some sequences of digits. These sequences, separated by underscore characters, represent the types and multiplicities of the result (first sequence) and the arguments (following sequences). The first digit in each sequence represents the type (e.g., 2 for integer, 3 for double word, 4 for string, 7 for void), and the following digits represent the multiplicity (8 for array, 13 for scalar). These codes are, of course, arbitrary. A different implementation could use a completely different encoding scheme.

Two features contribute to reducing the size (hence, generation overhead) of the CALLFILE: (1) the fact that generic functions are generated only for external procedures actually called by the application, and (2) the generic nature of these functions (i.e., the one-to-many relation between generic functions and external procedures).

Communicating Arguments

The argument array is an array used by the Executor to pass values between an application and external procedures. Since the Executor, the CALLFILE, and the external procedures share the same address space, they may all access the array. The elements of the argument array are unions of the following type:

TABLE 3

| union value | {int | integer; |
|---|---|---|
| | double | real; |
| | char | *string; |
| | int | *int_array; |
| | double | *real_array; |
| | char | **string_array;}; |

The elements of the array correspond to the arguments of the external procedure in the natural order. Arguments of type integer, double, string are stored in the integer, real, string fields of the elements. Analogously, the base addresses of arguments which are arrays of type integer, double, string are stored in the int_array, real_array, string_array fields.

CALLFILES can also be used for interfacing programs (whether interpreted or compiled) with procedures specified by an interactive user at run-time. Assume that a user of a program specifies at run-time the name, signature and arguments of an external procedure to be invoked. The program can then call a service routine which (1) generates a CALLFILE with a generic function corresponding to the procedure signature, and (2) proceeds to call the external procedure through the generic function.

Since CALLFILES can be implemented in a high-level programming language as shown, they easily port to any operating system that supports dynamic loading.

The generation of the CALLFILE at translation time ensures that only the required calling sequences are generated, thus avoiding the exponential number of calling sequences required by the selection-code approach.

CALLFILES can also be used for interfacing programs with external procedures specified by an interactive user at run-time.

The procedure signatures defined in a SIGFILE can be used by the Interpreter to perform interface type-checking on external procedure calls made within an application.

Using the foregoing specifications the invention may be implemented using standard programming and/or engineering techniques. While the preferred embodiment of the present invention has been illustrated in detail, it should be apparent that modifications and adaptations to that embodiment may occur to one skilled in the art without departing from the scope of the present invention as set forth in the following claims.

---

Appendix

Sample SIGFILE:

```
routine add1_c
    file "adds"
    language c
    type integer
    input
        i, j: integer;
end
routine add2_c
    file "adds"
    language c
    type real
    input
        x, y: real;
end
routine add3_c
    file "adds"
    language c
    type array[10] of integer
    input
        a: array[] of integer (variable);
        b: array[] of integer;
        i: integer;
end
routine add4_c
    file "adds"
    language c
    type string
    input
        s: string;
end
routine add5_c
    file "adds"
    language c
```

---

Appendix

-continued

Sample SIGFILE:

```
    type array[i] of string
    input
        a: array[] of string;
        i: integer;
end
routine add6_c
    file "adds"
    language c
    type array[i] of real
    input
        a: array[] of real (variable);
        b: array[] of real;
        i: integer;
end
routine add0_f
    file "adds"
    language fortran
    type void
    input
        i: integer (variable);
        j: integer;
end
routine add1_f
    file "adds"
    language fortran
    type integer
    input
        i, j: integer;
end
routine add2_f
    file "adds"
    language fortran
    type real
    input
        x, y: real;
end
routine add3_f
    file "adds"
    language fortran
    type integer
    input
        a: f_array[] of integer (variable);
        b: f_array[] of integer;
        i: integer;
end
routine add4_f
    file "adds"
    language fortran
    type string *4
    input
        s: string *4;
end
routine add5_f
    file "adds"
    language fortran
    type string *4
    input
        a: f_array[] of string *4 (variable);
        i: integer;
end
routine add6_f
    file "adds"
    language fortran
    type real
    input
        a: f_array[] of real (variable);
        b: f_array[] of real;
        i: integer;
end
routine add7_f
    file "adds"
    language fortran
    type real
    input
```

```
                    Appendix
Sample SIGFILE:
        a, b: complex;
        c: f_array[5] of complex (variable);
        n: integer;
end
```

What is claimed is:

1. A method of operating a computer system to process an interpretable program, the computer system including an interpreter, and having a processor and a memory, the method comprising the steps of:

executing the interpreter on the interpretable program until encountering a calling reference to a separately compiled procedure for accepting one or more arguments and responsively producing some result;

reading into the memory a signature file that identifies the arguments and any result of the separately compiled procedure; and generating source code for a call file procedure that accepts from the interpreter the arguments identified in the signature file, passes the arguments to the separately compiled procedure and returns to the interpreter any result identified in the signature file.

2. The method of claim 1 further comprising the steps of:

compiling the source code for the call file procedure to produce a call file containing loadable object code that is callable;

calling the call file with the arguments;

calling the separately compiled procedure from within the call file with the arguments; and returning control to the interpreter along with any result generated by the separately compiled procedure.

3. The method of claim 1 wherein the step of generating source code for a call file procedure further comprises generating source code for accepting from the interpreter the arguments for the separately compiled procedure addressed in a first format and passing the arguments to the separately compiled procedure by addressing the arguments in a second format required by the separately compiled procedure.

4. The method of claim 3 wherein the interpretable program contains a plurality of calling references to a plurality of separately compiled procedures each requiring a different argument format, wherein the call file procedure corresponding to the calling references accept the arguments addressed in an unvarying first format, wherein the format for addressing the arguments being passed to each separately compiled procedure varys as required by the separately compiled procedure, and wherein the call files all present a single unvarying addressing interface to the interpreter while also calling a plurality of separately compiled procedures each requiring a different argument addressing format.

5. The method of claim 4 wherein the first argument addressing format is an array containing the arguments.

6. The method of claim 1 wherein the signature file identifies a language in which the separately compiled procedure was written.

7. The method of claim 1 wherein the signature file identifies a selected passing mode for each of the arguments and the source code is generated to pass each argument in the selected passing mode identified by the signature file.

8. The method of claim 1 wherein the source code for the call file is generated to accept an address of the separately compiled procedure and to call the separately compiled procedure at the address.

9. A method of operating a computer system to process an interpretable program having a calling reference to a separately compiled procedure for accepting one or more arguments and responsively producing some result, the computer system including an interpreter, the computer system having a processor, a memory and a nonvolatile storage, the method comprising the steps of:

(a) executing the interpreter on the interpretable program until encountering the calling reference (b) searching the nonvolatile storage for a previously compiled call file object code corresponding to the calling reference and responsive to the previously compiled call file object code not being found or a last date of change on the call file object code being earlier than a last date of change on a signature file corresponding to the calling reference, performing the following steps:

(b.1) reading into the memory the signature file corresponding to the calling reference which identifies the arguments and result of the separately compiled procedure, (b.2) generating source code for a call file procedure that accepts from the interpreter the arguments addressed in a first format, passes the arguments to the separately compiled procedure by addressing the arguments in a second format required by the separately compiled procedure and returns to the interpreter any result identified in the signature file, and (b.3) compiling the source code for the call file procedure to produce a call file containing loadable object code;

(c) calling the call file with the arguments addressed in the first format;

(d) calling the separately compiled procedure from within the call file with the arguments addressed in the second format; and (e) returning control to the interpreter along with any result generated by the separately compiled procedure.

10. The method of claim 9 wherein the first format is an array containing the arguments and the second format is a set of datatypes corresponding to each of the arguments required by the separately compiled procedure.

11. The method of claim 9 wherein the signature file identifies a language in which the separately compiled procedure was written.

12. The method of claim 9 wherein the signature file identifies a selected passing mode for each of the arguments and the source code is generated to pass each argument in the selected passing mode identified by the signature file.

13. The method of claim 9 wherein the the source code for the call file is generated to accept an address of the separately compiled procedure and to call the separately compiled procedure at the address.

14. A system for processing an interpretable program having a calling reference to a separately compiled procedure for accepting one or more arguments and responsively producing some result, the system including an interpreter, a processor and a memory, comprising:

means for detecting the calling reference during the interpretation of the interpretable program;

sigfile processor, coupled to the means for detecting, which accepts as input a signature file that identifies the arguments and any result of the separately compiled procedure and that generates source code for a call file procedure which accepts from the interpreter the arguments for the separately compiled procedure, passes the arguments to the separately compiled procedure and returns to the interpreter any result identified in the signature file.;

compiler interface controller for passing the source code to a compiler for generating a call file containing loadable object code that is callable; and executor means for executing the calling reference by calling the loadable object code in the call file with the arguments and receiving any result of the separately compiled procedure.

15. The system of claim 14 wherein the source code for the call file accepts from the interpreter the arguments for the separately compiled procedure addressed in a first format and passes the arguments to the separately compiled procedure by addressing the arguments in a second format required by the separately compiled procedure.

16. The system of claim 14 wherein the sigfile processor includes means for identifying from the signature file a language in which the externally compiled procedure was written.

17. The system of claim 14 wherein the sigfile processor includes means for identifying a selected passing mode for each of the arguments and means for generating the source code to pass each argument in the selected passing mode identified by the signature file.

18. The system of claim 14 wherein the sigfile processor includes means for generating the source code for the call file to accept an address of the separately compiled procedure and to call the address, and the executor includes means for passing the call file the address of the separately compiled procedure.

* * * * *